(12) United States Patent
Kofuji

(10) Patent No.: US 11,652,551 B2
(45) Date of Patent: *May 16, 2023

(54) REPAIR TERMINAL AND INFORMATION PROCESSING DEVICE

(71) Applicant: TOSHIBA TEC KABUSHIKI KAISHA, Tokyo (JP)

(72) Inventor: Misako Kofuji, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,323

(22) Filed: Aug. 26, 2021

(65) Prior Publication Data

US 2021/0384972 A1 Dec. 9, 2021

Related U.S. Application Data

(63) Continuation of application No. 17/065,613, filed on Oct. 8, 2020, now Pat. No. 11,133,868.

(30) Foreign Application Priority Data

Dec. 24, 2019 (JP) .............................. JP2019-232431

(51) Int. Cl.
*H04B 10/116* (2013.01)
*H04M 1/737* (2006.01)
*H04B 10/40* (2013.01)
*H04B 10/50* (2013.01)

(52) U.S. Cl.
CPC .......... *H04B 10/116* (2013.01); *H04B 10/40* (2013.01); *H04B 10/502* (2013.01); *H04M 1/737* (2013.01)

(58) Field of Classification Search
CPC .... H04B 10/116; H04B 10/40; H04B 10/502; H04M 1/737
USPC ....................................................... 398/130
See application file for complete search history.

(56) References Cited

U.S. PATENT DOCUMENTS

| | | | |
|---|---|---|---|
| 7,882,205 B2* | 2/2011 | Sugaya | H04L 41/0843 709/221 |
| 11,133,868 B2* | 9/2021 | Kofuji | H04B 10/502 |
| 2007/0147843 A1* | 6/2007 | Fujiwara | H04B 10/1143 398/118 |

(Continued)

FOREIGN PATENT DOCUMENTS

JP 2019-139430 8/2019

OTHER PUBLICATIONS

Chinese Office Action for Chinese Patent Application No. 202011084747.1 dated Jul. 5, 2022.

*Primary Examiner* — Dalzid E Singh
(74) *Attorney, Agent, or Firm* — Amin, Turocy & Watson, LLP

(57) ABSTRACT

According to one embodiment, a repair terminal includes reception means for receiving a setting value of a predetermined setting item set in an information processing device by visible light communication using light emitted by a light source device connected to the information processing device; matching means for matching a setting value of the setting item received by the reception means with a matching setting value corresponding to the setting item and determining appropriateness of the setting value; and output means for outputting a matching result of the matching means.

20 Claims, 15 Drawing Sheets

(56) References Cited

U.S. PATENT DOCUMENTS

| | | | |
|---|---|---|---|
| 2013/0086421 A1* | 4/2013 | Sugaya | G06F 11/0742 |
| | | | 714/E11.178 |
| 2014/0086590 A1* | 3/2014 | Gan | H04W 12/06 |
| | | | 398/118 |
| 2017/0098354 A1* | 4/2017 | Loeb | H04B 10/116 |
| 2017/0307246 A1 | 10/2017 | Ohara et al. | |
| 2018/0262908 A1* | 9/2018 | Yeom | H04L 63/18 |

* cited by examiner

REPAIR TERMINAL AND INFORMATION PROCESSING DEVICE

CROSS-REFERENCE TO RELATED APPLICATIONS

This application is a Continuation of application Ser. No. 17/065,613 filed on Oct. 8, 2020, the entire contents of which are incorporated herein by reference.

This application is based upon and claims the benefit of priority from Japanese Patent Application No. 2019-232431, filed Dec. 24, 2019, the entire contents of which are incorporated herein by reference.

FIELD

Embodiments described herein relate generally to a repair terminal and an information processing device.

BACKGROUND

In the related art, in a store such as a supermarket, a merchandise selling data processing device such as a point of sales (POS) terminal is used. In such a POS terminal, various settings according to the usage environment are set as setting information. In the related art, proposed is a technique to acquire the setting information set in the POS terminal of the store from a server placed outside the store via the network and set the acquired setting information to other POS terminals connected to the network.

Meanwhile, there are some stores that cannot be connected to external devices or networks due to security reasons. In such a case, a maintenance staff goes to the store and manually performs a work of changing the setting information with reference to a paper on which a setting content is printed or the setting content displayed on a display unit of a terminal device. In this case, the maintenance staff visually confirms whether the set content is correct.

However, the visual confirmation as described above is complicated, and a setting mistake may occur due to confirmation omission or the like. Therefore, a technique that can efficiently perform a change work of setting information is desired.

DETAILED DESCRIPTION

An object to be achieved by the present embodiment is to provide a repair terminal and an information processing device that can efficiently perform a change work of setting information.

In general, according to one embodiment, a repair terminal includes reception means, matching means, and output means. The reception means receives a setting value of a predetermined setting item set in an information processing device by visible light communication using light emitted by a light source device connected to the information processing device. The matching means matches a setting value of the setting item received by the reception means with a matching setting value corresponding to the setting item and determines appropriateness of the setting value. The output means outputs a matching result of the matching means.

Hereinafter, with reference to the accompanying drawings, a repair terminal and an information processing device according to embodiments are described. Hereinafter, a POS terminal used in the store is described as a device of a repair target. The configurations are not limited by the embodiments described below.

First Embodiment

Figure 1:
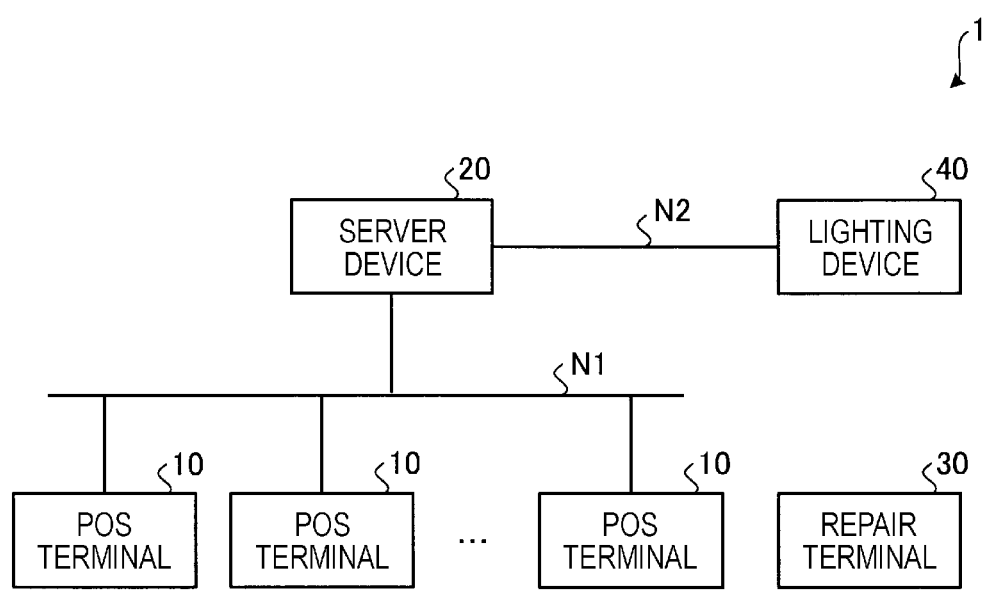
FIG. 1 is a diagram illustrating an example of a repair system according to a first embodiment.

FIG. 1 is a diagram illustrating an example of a repair system according to the present embodiment. As illustrated in FIG. 1, a repair system 1 includes POS terminals 10, a server device 20, and a repair terminal 30. The repair system 1 includes a lighting device 40.

The POS terminal 10 and the server device 20 are connected to each other, for example, via a network N1 such as a local area network (LAN) provided in the store. The server device 20 and the lighting device 40 are connected to each other via a cable N2 such as a control line. That is, the POS terminal 10 and the lighting device 40 are connected to each other via the server device 20. The number of the POS terminals 10 or the lighting devices 40 is not limited to the example of FIG. 1.

The POS terminal 10 is an example of the information processing device. The POS terminal 10 is provided in a settlement part in a store and settles the merchandise purchased by the customer. In the present embodiment, the POS terminal 10 is a device of a repair target and updates a data by a maintenance staff as described below. The POS terminal 10 is not limited to a general POS terminal operated by a clerk of the store and includes a self-service-type POS terminal operated by a customer. The POS terminal 10 includes a semi-self-service-type POS terminal in which a clerk operates the sales registration and a customer performs a payment operation.

The POS terminal 10 includes a clerk display unit 110 including a back light 1101 described below. The POS terminal 10 can perform visible light communication by modulating the intensity of light emitted by the back light 1101. As the visible light communication, well-known and commercially available techniques can be used.

For example, the server device 20 is a store server provided in the store, and receives various kinds of information transmitted from each of the POS terminals 10. The server device 20 is connected to the lighting device 40 and controls light emission of the lighting device 40.

For example, the plurality of lighting devices 40 are installed on a ceiling part of the store, and illuminate an entrance or exit of the store, a display part where merchandises are displayed, the settlement part, and the like from above. The server device 20 can perform visible light communication by modulating the intensity of the light emitted by the lighting device 40.

According to the present embodiment, as the light source of the back light 1101 and the lighting device 40 described below, a light source device such as light emitting diode (LED) lighting is used. In particularly, the LED lighting allows the modulation frequency to be set high. Therefore, when the LED lighting is used as the light source of the back light 1101 or the lighting device 40, it is possible to modulate the light intensity in a high frequency band where the human eyes do not feel flicker.

The repair terminal 30 is an example of the repair terminal. The repair terminal 30 is carried by the maintenance staff and is used when a repair work of the POS terminal 10 is performed. For example, as the repair terminal 30, a mobile terminal device such as a smart phone or a tablet terminal can be used. The repair terminal 30 can receive the information transmitted by the visible light communication by analyzing image data imaged by an imaging unit 310 described below.

Subsequently, the device configuration of the repair system 1 described above is described.

Figure 2:
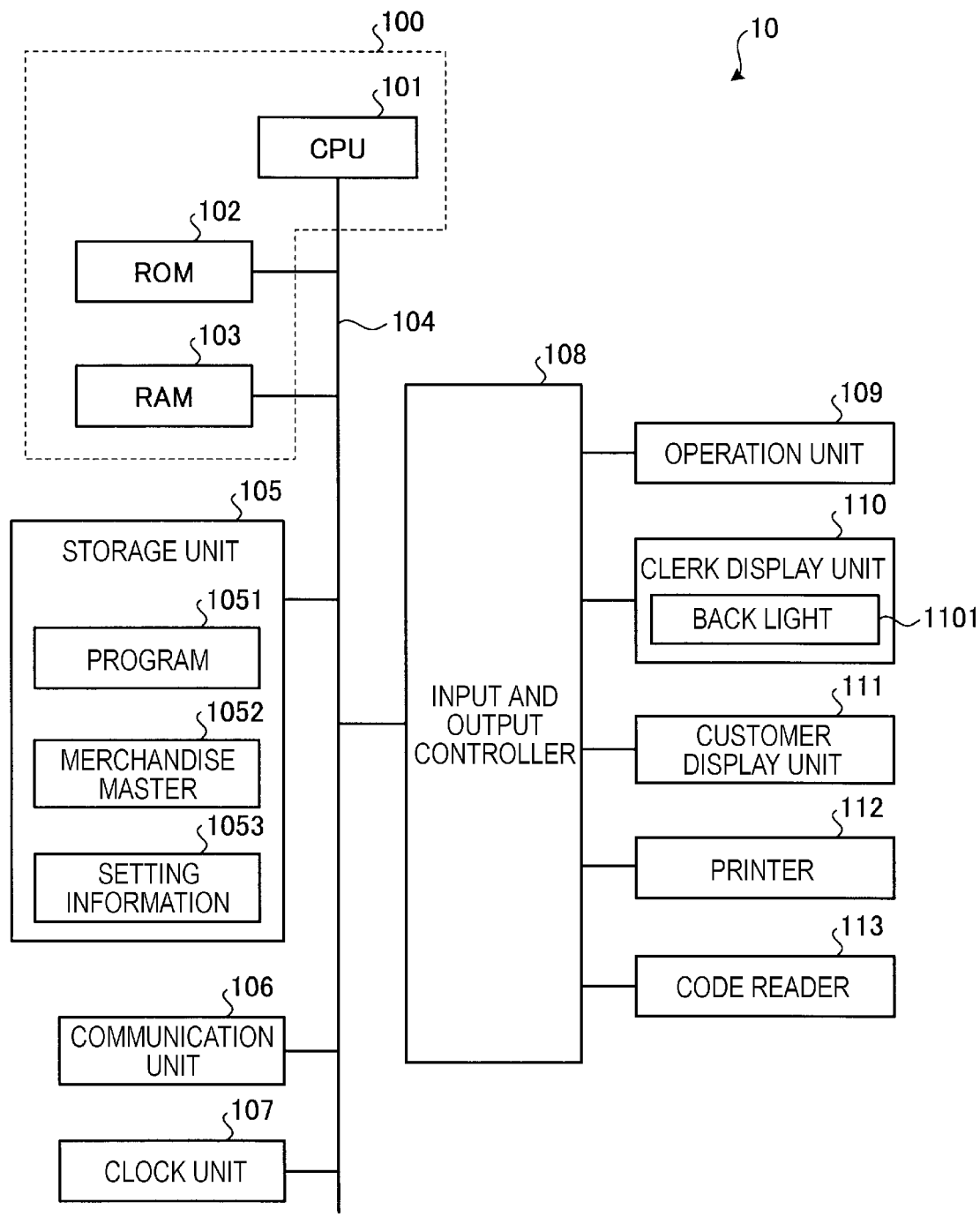
FIG. 2 is a diagram illustrating an example of a hardware configuration of a POS terminal according to the first embodiment.

First, the hardware configuration of the POS terminal 10 is described. FIG. 2 is a diagram illustrating an example of the hardware configuration of the POS terminal 10. As illustrated in FIG. 2, the POS terminal 10 includes a central processing unit (CPU) 101, a read only memory (ROM) 102, and a random access memory (RAM) 103.

The CPU 101 is an example of a processor and integrally controls the operation of the POS terminal 10. The ROM 102 stores various programs. The RAM 103 is a work space into which various programs or various kinds of data are loaded. The CPU 101, the ROM 102, and the RAM 103 are connected to each other via a bus 104. The CPU 101, the ROM 102, and the RAM 103 configure a control unit 100 of the computer configuration. In the control unit 100, the CPU 101 performs various processes by operating the program recorded in the ROM 102 or a storage unit 105 described below and loaded into the RAM 103.

The storage unit 105 is connected to the control unit 100 via the bus 104. The storage unit 105 is a storage device such as a solid state drive (SSD), a hard disc drive (HDD), and a flash memory, and maintains a storing content even when the power is cut off.

The storage unit 105 records a program 1051, a merchandise master 1052, setting information 1053, and the like. The program 1051 is a program for realizing various functions performed by the CPU 101. The merchandise master 1052 is a database in which information relating to the merchandise to be sold in the store is stored. For example, the merchandise master 1052 retains various kinds of merchandise information such as a name of a merchandise, a price, or the like in correlation with a merchandise code for identifying each merchandise.

For example, the setting information 1053 is prepared on a per function basis or on a per program basis, and various settings are stored therein according to the operation of the POS terminal 10. Specifically, the setting information 1053 has a plurality of items (hereinafter, also referred to as a setting item) and retains a setting value on a per setting item basis. For example, the setting information 1053 has a setting item relating to the connection to the network N1.

According to the present embodiment, the setting of the setting information 1053 is changed by the operation of the maintenance staff. Here, the setting change is a concept of including an operation of performing a new setting in addition to the operation of changing of an existing setting. The state of the POS terminal 10 before the setting change may be a state of incapable of being connected to the network N1 or may be a state of being connected to the network N1.

A communication unit 106 and a clock unit 107 are connected to the control unit 100 via the bus 104. The communication unit 106 is a wired or wireless communication interface capable of being connected to the network N1. The communication unit 106 communicates with the server device 20 or the like via the network N1. The clock unit 107 is a clock device such as a real time clock (RTC). For example, the clock unit 107 tracks current date and time.

An operation unit 109, the clerk display unit 110, a customer display unit 111, a printer 112, a code reader 113, and the like are connected to the control unit 100 via the bus 104 and an input and output controller 108.

The operation unit 109 is configured with a keyboard having various operation buttons, a pointing device, or the like. The operation unit 109 receives an operation of an operator and outputs the received operation content to the control unit 100.

The clerk display unit 110 is a display device of a liquid crystal display (LCD) or the like which has the back light 1101. The back light 1101 is configured with a light source device such as an LED as described above. The back light 1101 can modulate light emitted by the light source device under the control of the control unit 100 to perform the visible light communication.

The clerk display unit 110 causes various screens such as a screen according to an operation of the POS terminal 10, a screen according to a settlement process of a merchandise, or a screen presenting an updated state of data, to be displayed, under the control of the control unit 100. For example, the operation unit 109 may be a touch panel provided on the surface of the clerk display unit 110.

For example, the customer display unit 111 is configured with a display device which is the same as the clerk display unit 110. The customer display unit 111 displays a screen to be presented to a customer, such as a screen according to a settlement process of a merchandise, under the control of the control unit 100.

For example, the printer 112 is a thermal printer or the like having a thermal head. The printer 112 prints merchandise information on long thermal paper, information according to the settlement, or the like and dispenses a receipt. The code reader 113 is a reading device that reads a code symbol such as a barcode attached to the merchandise. The code reader 113 receives the input of the merchandise purchased by the customer by reading the merchandise code retained in the code symbol.

Figure 3:
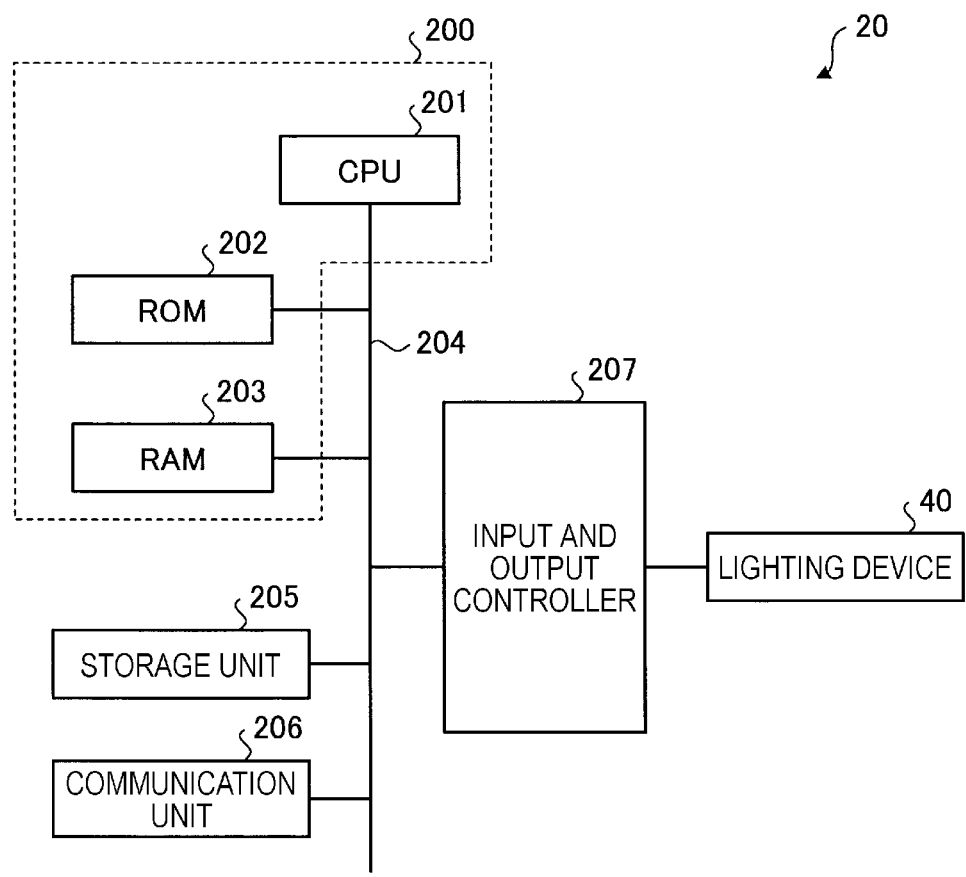
FIG. 3 is a diagram illustrating an example of a hardware configuration of a server device according to the first embodiment.

Subsequently, the hardware configuration of the server device 20 is described. FIG. 3 is a diagram illustrating an example of the hardware configuration of the server device 20. As illustrated in FIG. 3, the server device 20 includes a CPU 201, a ROM 202, and a RAM 203.

The CPU 201 is an example of a processor and integrally controls the operation of the server device 20. The ROM 202 stores various programs. The RAM 203 is a work space into which various programs or various kinds of data are loaded. The CPU 201, the ROM 202, and the RAM 203 are connected to each other via a bus 204. The CPU 201, the ROM 202, and the RAM 203 configure a control unit 200 of the computer configuration. In the control unit 200, the CPU 201 performs various processes by operating the program stored in the ROM 202 or a storage unit 205 described below and loaded into the RAM 203.

The storage unit 205 and a communication unit 206 are connected to the control unit 200 via the bus 204. The storage unit 205 is a storage device such as SSD, HDD, and a flash memory, and maintains a recording content even when the power is cut off. Various programs to be executed by the CPU 201 and setting information are stored in the storage unit 205. The communication unit 206 is a wired or wireless communication interface capable of being connected to the network N1. The communication unit 206 communicates with the POS terminal 10 or the like via the network N1.

The lighting device 40 is connected to the control unit 200 via the bus 204, an input and output controller 207, and the like. The lighting device 40 has a light source device such as LED lighting as described above. The lighting device 40 can modulate light emitted by the light source device under the control of the control unit 200 to perform the visible light communication.

Figure 4:
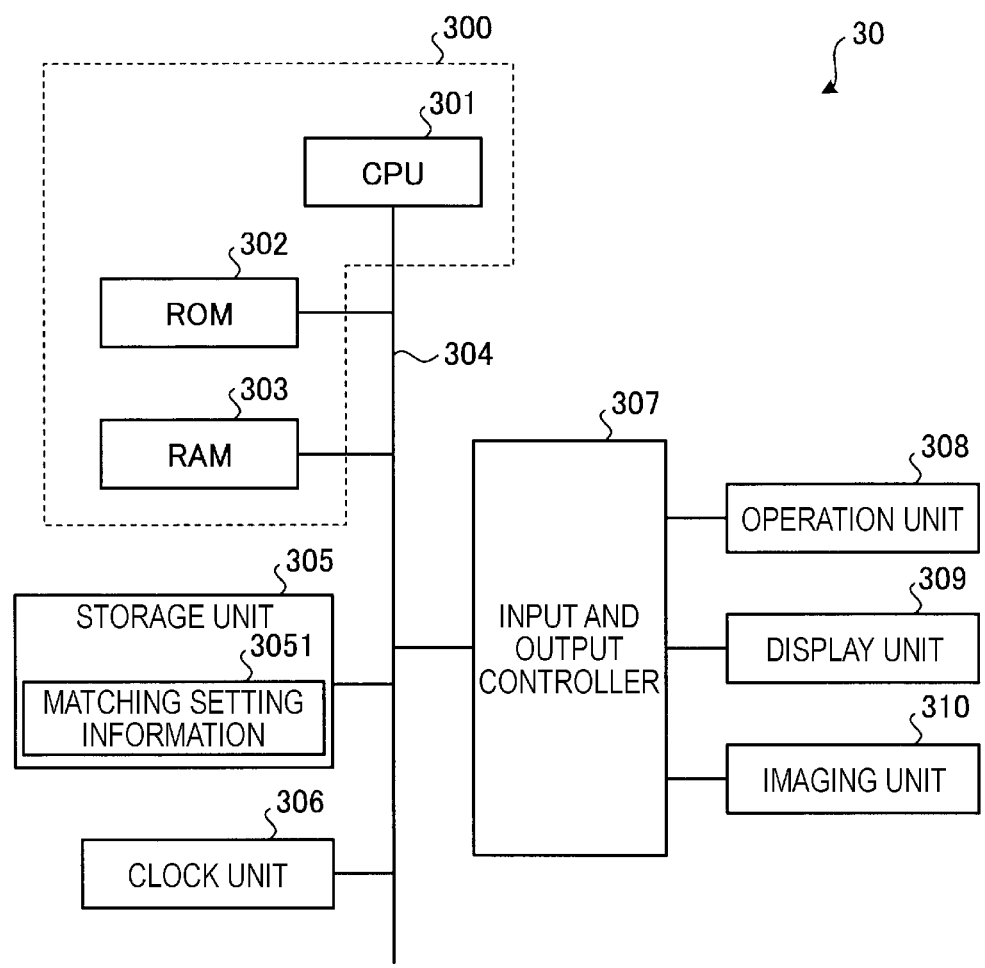
FIG. 4 is a diagram illustrating an example of a hardware configuration of a repair terminal according to the first embodiment.

Subsequently, the hardware configuration of the repair terminal 30 is described. FIG. 4 is a diagram illustrating an example of the hardware configuration of the repair terminal 30. As illustrated in FIG. 4, the repair terminal 30 includes a CPU 301, a ROM 302, and a RAM 303.

The CPU 301 is an example of a processor and integrally controls the operation of the repair terminal 30. The ROM 302 stores various programs. The RAM 303 is a work space into which various programs or various kinds of data are loaded. The CPU 301, the ROM 302, and the RAM 303 are connected to each other via a bus 304. The CPU 301, the ROM 302, and the RAM 303 configure a control unit 300 of the computer configuration. In the control unit 300, the CPU 301 performs various processes by operating the program stored in the ROM 302 or a storage unit 305 described below and loaded into the RAM 303.

The storage unit 305 and a clock unit 306 are connected to the control unit 300 via the bus 304. The storage unit 305 is a storage device such as SSD, HDD, and a flash memory, and maintains a storing content even when the power is cut off. Various programs to be executed by the CPU 301 and setting information (not illustrated) are stored.

Matching setting information 3051 obtained by recording the changed content when the setting of the setting information 1053 of the POS terminal 10 is changed is stored in the storage unit 305. The matching setting information 3051 has a setting item which is the same as the setting information 1053 and the setting content after the change is stored therein on a per setting item basis. That is, the setting item and the setting content of the setting information 1053 after the setting change are stored in the matching setting information 3051.

According to the present embodiment, an environment in which the POS terminal 10 and the repair terminal 30 cannot communicate with each other via the network N1 is assumed. Therefore, the maintenance staff causes a display unit 309 to display the matching setting information 3051 and changes the setting of the POS terminal 10 while referring to the displayed matching setting information 3051. According to the embodiment, the maintenance staff may perform a setting change work of the POS terminal 10 by using the matching setting information 3051 printed on a paper medium.

The clock unit 306 is a clock device such as RTC. For example, the clock unit 306 tracks current date and time.

An operation unit 308, the display unit 309, the imaging unit 310, and the like are connected to the control unit 300 via the bus 304 and an input and output controller 307.

The operation unit 308 is configured with a keyboard having various operation buttons, a pointing device, or the like. The operation unit 308 receives an operation of an operator and outputs the received operation content to the control unit 300. The display unit 309 is a display device such as LCD. The display unit 309 causes various screens to be displayed under the control of the control unit 300. For example, the operation unit 308 may be a touch panel provided on the surface of the display unit 309.

The imaging unit 310 is an imaging device having an image sensor such as a charge coupled device (CCD) and a complementary MOS (CMOS). The imaging unit 310 outputs the image data obtained by the imaging to the control unit 300.

According to the present embodiment, the imaging unit 310 images a moving image as the image data. The imaging unit 310 is used for receiving the light emitted by the clerk display unit 110 (the back light 1101) or the lighting device 40. Instead of the imaging unit 310, a light receiving device for visible light communication may be included.

Subsequently, the functional configuration of the repair system 1 is described.

Figure 5:
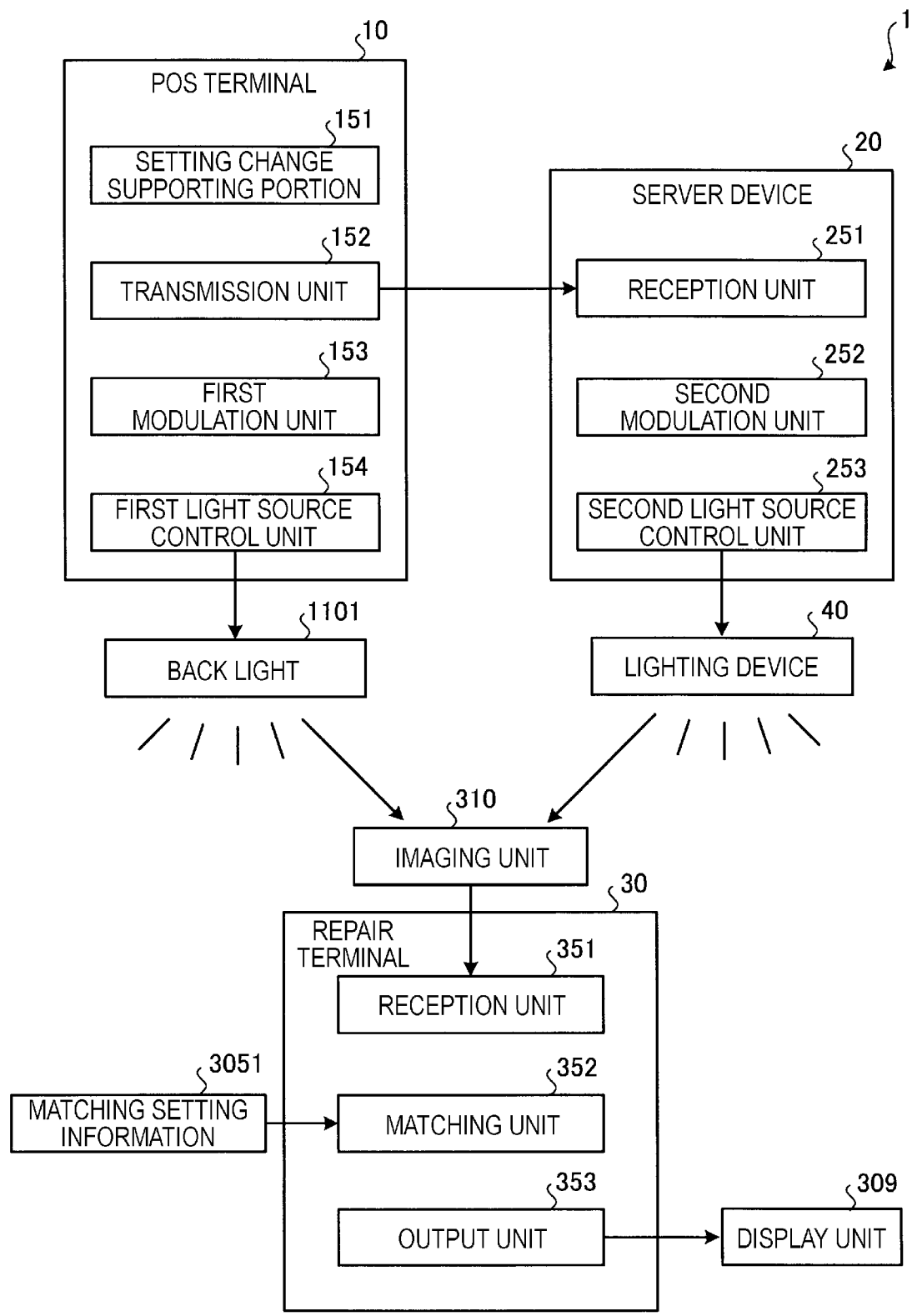
FIG. 5 is a diagram illustrating an example of a functional configuration of the repair system.

FIG. 5 is a diagram illustrating an example of the functional configuration of the repair system 1. In FIG. 5, the relationships between the functional units related to each device are indicated by arrows. In FIG. 5, for convenience of explanation, functional units included in each device are illustrated inside the device, and a hardware configuration included in each device is illustrated outside the device.

As illustrated in FIG. 5, the POS terminal 10 includes a setting change supporting portion 151, a transmission unit 152, a first modulation unit 153, and a first light source control unit 154, as the functional units. For example, these functional units are activated when the POS terminal 10 transitions to the maintenance mode for a repair work by a predetermined operation via the operation unit 109.

Some or all of the functional units described above may be a software configuration which is realized in cooperation with the program 1051 stored in the processor (for example, the CPU 101) and the memory (for example, the ROM 102 and the storage unit 105) of the POS terminal 10. Some or all of the functional units of the functional units described above may be a hardware configuration realized by a dedicated circuit or the like mounted on the POS terminal 10.

The setting change supporting portion 151 is an example of the reception means and the setting means. The setting change supporting portion 151 performs a process according to the setting change of the setting information 1053.

Specifically, the setting change supporting portion 151 causes the clerk display unit 110 to display a screen for supporting a setting change work. Hereinafter, referring to FIGS. 6 to 9, a screen example displayed by the setting change supporting portion 151 is described.

FIGS. 6 to 9 are diagrams illustrating examples of a screen displayed by the setting change supporting portion 151. First, when the POS terminal 10 transitions to the maintenance mode for the setting change, the setting change supporting portion 151 causes the clerk display unit 110 to display an item selection screen G1 illustrated in FIG. 6.

Figure 6:
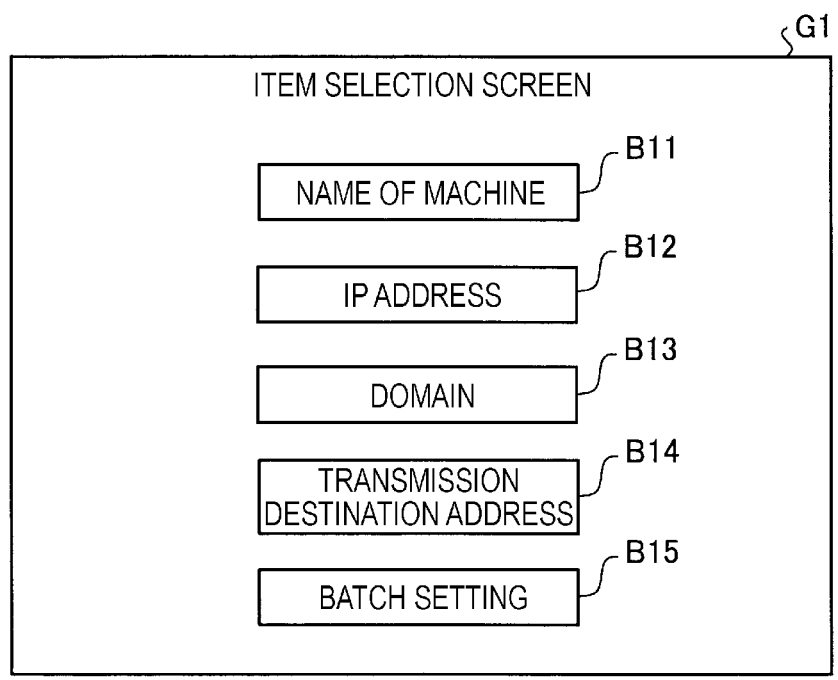
FIG. 6 is a diagram illustrating an example of a screen displayed by a setting change processing portion according to the first embodiment.

As illustrated in FIG. 6, setting items to be targets of the setting change are displayed on the item selection screen G1 in a selectable manner. The setting change supporting portion 151 causes the item selection screen G1 to display operators with which each of the setting items can be selected, based on the setting item included in the setting information 1053.

The item selection screen G1 of FIG. 6, with respect to the setting information 1053 according to the connection to the network N1, illustrates an example in which operators (buttons B11 to B15) with which each of the setting items included in the setting information 1053 can be selected are displayed.

For example, the button B11 is an operator for selecting a setting item according to a setting of the name of a machine (hereinafter, also referred to as a host name). The button B12 is an operator for selecting a setting item according to a setting of an IP address. The button B13 is an operator for selecting a setting item according to a setting of a domain. The button B14 is an operator for selecting a setting item according to the setting of a transmission destination address (IP address) to be a transmission destination of various kinds of data. Here, the transmission destination address can set an IP address or the like of the store server or the like to be a transmission destination of the settlement data obtained by the settlement process of the merchandise. As the transmission destination address, an IP address of the server device 20 can be set. The button B15 is an operator for a case where the name of a machine, an IP address, a domain, and a transmission destination address, which are described above, are simultaneously changed.

A display form of the item selection screen G1 is not limited to an example of FIG. 6. For example, the item selection screen G1 may include an operator for adding a newly selected item or an operator for deleting a previously selected item. When the plurality of kinds of the setting information 1053 are prepared on a per usage or program basis, the item selection screen G1 may include an operator of enabling the designation of a file name of the setting information 1053 to be a target of the setting change, or the like.

Figure 7:
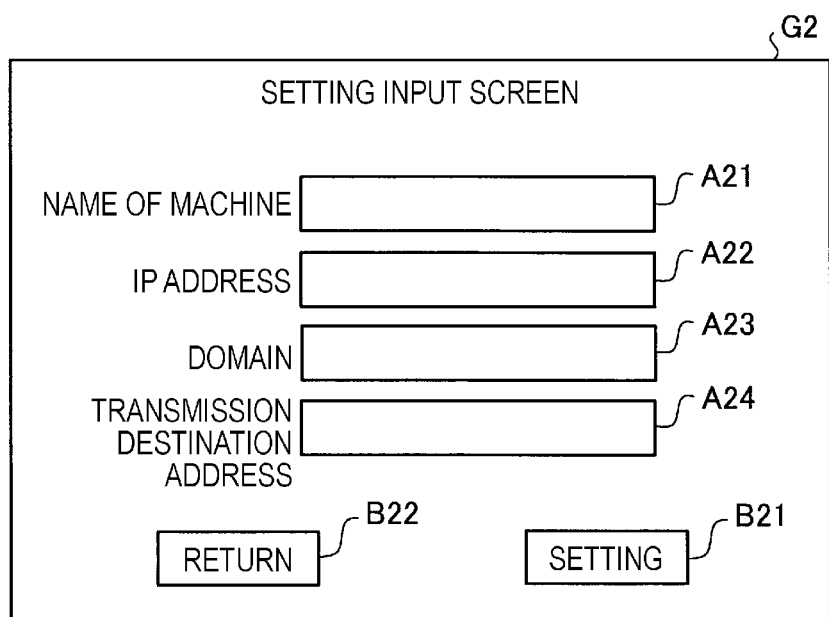
FIG. 7 is a diagram illustrating an example of the screen displayed by the setting change processing portion.

When any one operator from the item selection screen G1 is selected, the setting change supporting portion 151 causes the clerk display unit 110 to display a setting input screen G2 illustrated in FIG. 7.

FIG. 7 is an example of the setting input screen G2. FIG. 7 illustrates the setting input screen G2 displayed when the button B15 is selected from the item selection screen G1 of FIG. 6.

Areas (areas A21 to A24) in which setting values of the setting item selected in the item selection screen G1 can be input are provided in the setting input screen G2. For example, the area A21 is an area for inputting the name of a machine (hereinafter, also referred to as a host name). The area A22 is an area for inputting an IP address. The area A23 is an area for inputting a domain. The area A24 is an area for inputting a transmission destination address. When an existing setting value is retained in the setting information 1053, the setting change supporting portion 151 may cause the existing setting value to be displayed in the corresponding area.

In the setting input screen G2, a setting button B21 and a return button B22 are provided. The setting button B21 is an operator for instructing the confirmation of the setting value. The return button B22 is an operator for instructing the return to the item selection screen G1.

In the setting input screen G2 described above, the maintenance staff inputs the setting value to each input area via the operation unit 109. The maintenance staff instructs the confirmation of the setting value by operating the setting button B21 when the input of the setting value is completed.

When the operation of the setting button B21 is received, the setting change supporting portion 151 registers (updates) the setting value by overwriting the setting value of each setting item input to the areas A21 to A24 on the setting value of the setting item corresponding to the setting information 1053. Accordingly, the setting value of the setting item selected as the setting target is set as the setting information 1053. When the return button B22 is operated, the setting change supporting portion 151 eliminates the setting input screen G2 and causes the item selection screen G1 to be displayed again.

Figure 8:
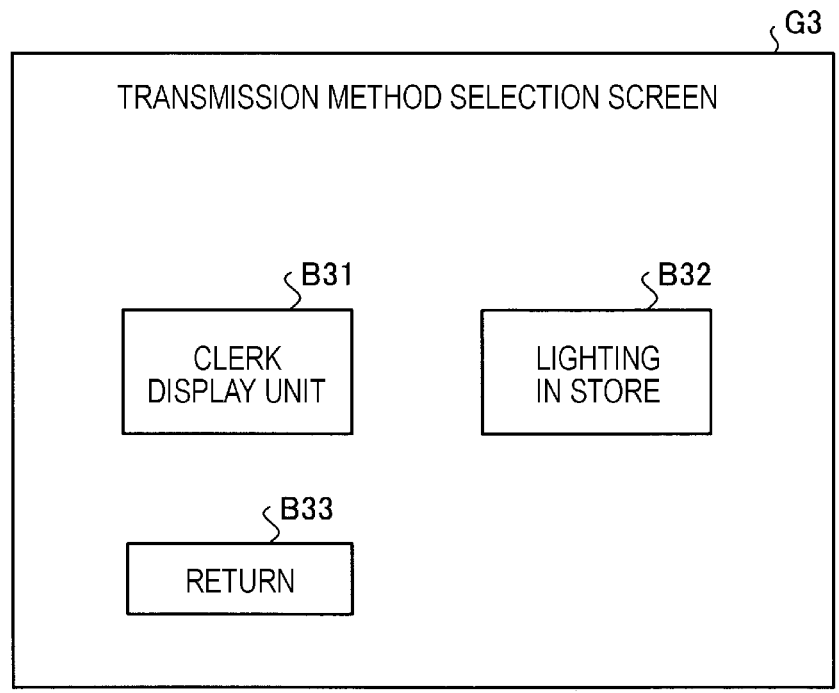
FIG. 8 is a diagram illustrating an example of the screen displayed by the setting change processing portion

When an operation of the setting button B21 is received, the setting change supporting portion 151 causes the clerk display unit 110 to display a transmission method selection screen G3 illustrated in FIG. 8.

FIG. 8 is an example of the transmission method selection screen G3. An operator for selecting a method of transmitting a setting content of the setting item changed in the setting input screen G2 is displayed on the transmission method selection screen G3.

Specifically, a button B31 and a button B32 are provided on the transmission method selection screen G3. Here, the button B31 is an operator for selecting the visible light communication using the back light 1101 of the clerk display unit 110. The button B32 is an operator for selecting the visible light communication using the lighting device 40.

In the configuration of the present embodiment, a transmission method selected in the operation of the button B32, that is, the visible light communication using the lighting device 40 requires a communication with the server device 20, and thus cannot be realized in an environment in which a communication with the server device 20 is not established. Therefore, when a communication with the server device 20 is not established, for example, the communication unit 106 is linked down, the setting change supporting portion 151 may perform control so that the button B32 is not selected by disabling or hiding the button B32.

In the transmission method selection screen G3 described above, the maintenance staff can select a desired transmission method via the operation unit 109. The setting change supporting portion 151 transmits the setting content of the setting item of which the setting is changed by the transmission method selected from the transmission method selection screen G3.

Here, the information obtained by associating the setting item to be a target of the setting change with the setting value of the corresponding setting item is included in the setting content transmitted from the POS terminal 10. The setting content may include the information indicating a terminal ID (for example, the name of a machine or an IP address) that identifies the POS terminal 10, a file name of the setting information 1053 to be a setting target, or the like.

In FIG. 8, for example, when the button B31 is selected, the setting change supporting portion 151 transmits the changed setting content of the setting item from the back light 1101 by the visible light communication in cooperation with the first modulation unit 153 and the first light source control unit 154. For example, when the button B32 is selected, the setting change supporting portion 151 transmits the setting content of the setting item of which the setting is changed to the server device 20, in cooperation with the transmission unit 152. Accordingly, in the server device 20, the setting content transmitted from the POS terminal 10 is transmitted from the lighting device 40 by the visible light communication. That is, the setting change supporting portion 151 transmits the setting content of the setting item of which the setting is changed from the lighting device 40 by the visible light communication in cooperation with the transmission unit 152 and the server device 20.

Figure 9:
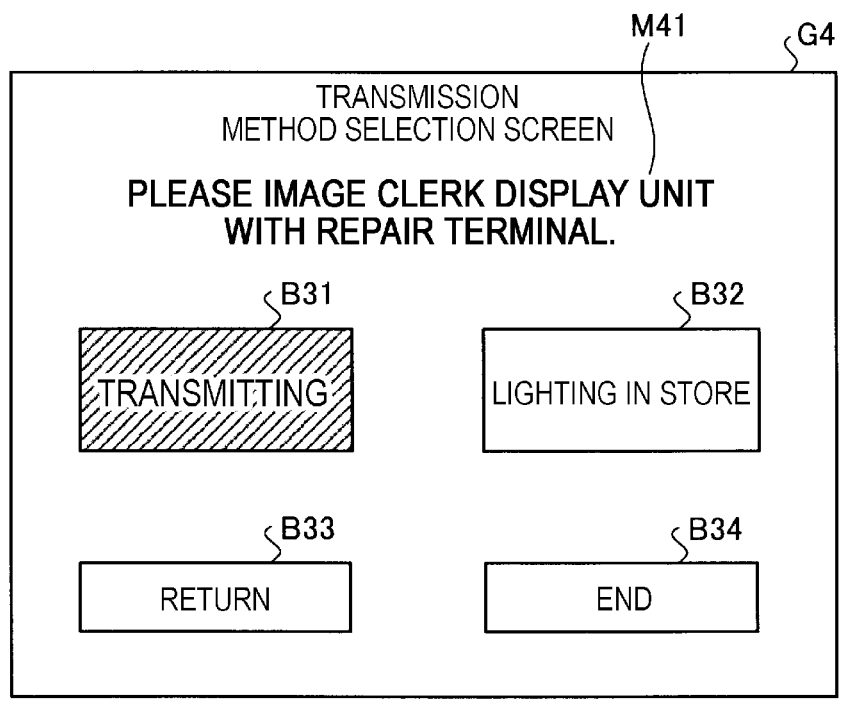
FIG. 9 is a diagram illustrating an example of the screen displayed by the setting change processing portion.

When an operation of the button B31 or the button B32 is received, the setting change supporting portion 151 notifies that the setting content is transmitting by changing the display of the transmission method selection screen G3 as illustrated in FIG. 9.

Here, FIG. 9 illustrates a screen transition example of the transmission method selection screen G3 when the button B31 is selected. As illustrated in FIG. 9, the setting change supporting portion 151 substitutes the display of the selected button B31 to "transmitting" for notifying that the setting content is transmitting by the visible light communication using the back light 1101 of the clerk display unit 110. The setting change supporting portion 151 displays a message M41 for promoting imaging the clerk display unit 110 with the repair terminal 30. The maintenance staff can receive the setting content transmitted from the back light 1101 by the visible light communication in the repair terminal 30 by imaging the clerk display unit 110 with the repair terminal 30 according to the message M41.

When the button B32 is selected, the setting change supporting portion 151 displays the message for promoting the imaging of the lighting device 40 with the repair terminal 30 as the message M41.

The setting change supporting portion 151 causes the transmission method selection screen G3 to display an end button B34 according to the operation of the button B31 or the button B32. For example, in the following process, when it is confirmed with the repair terminal 30 that the setting content is not wrong, the maintenance staff instructs an end of the setting change by operating the end button B34. When an operation of the end button B34 is received, the setting change supporting portion 151 ends a setting change supporting process by eliminating a transmission method selection screen G4.

A return button B33 provided on the transmission method selection screen G3 is an operator for instructing a return to the item selection screen G1 or the setting input screen G2. When an operation of the return button B33 is received, the setting change supporting portion 151 eliminates the transmission method selection screen G3 and displays the item selection screen G1 or the setting input screen G2 again. For example, in the following process, when a setting mistake in the setting content is detected with the repair terminal 30, the maintenance staff can perform resetting such as a correction of the setting item in which a setting mistake is detected by operating the return button B33.

Referring back to FIG. 5, the transmission unit 152 transmits the setting content of the setting item of which the setting is changed to the server device 20 in cooperation with the setting change supporting portion 151. The setting item transmitted to the server device 20 is transmitted by the visible light communication via the lighting device 40. That is, the transmission unit 152 functions as an example of the transmission means.

The first modulation unit 153 functions as an example of the transmission means together with the first light source control unit 154. The first modulation unit 153 generates the control signal for transmitting the setting content of the setting item of which the setting is changed by the visible light communication, in cooperation with the setting change supporting portion 151. Specifically, the first modulation unit 153 generates the control signal for the visible light communication by superimposing the information indicating the setting content on the control signal for controlling the light emission of the back light 1101.

The first light source control unit 154 controls the light emission of the back light 1101 based on the control signal generated by the first modulation unit 153. The first light source control unit 154 transmits the setting content of the setting item of which the setting is changed by the visible light communication by controlling the light emission of the back light 1101.

The server device 20 includes a reception unit 251, a second modulation unit 252, and a second light source control unit 253, as the functional units.

Some or all of the functional units described above may be a software configuration which is realized in cooperation with a program stored in the processor (for example, the CPU 201) and the memory (for example, the ROM 202 and the storage unit 205) of the server device 20. Some or all of the functional units of the functional units described above may be a hardware configuration realized by a dedicated circuit or the like mounted on the server device 20.

The reception unit 251 receives the information transmitted from the POS terminal 10. Specifically, the reception unit 251 receives the setting content transmitted from the transmission unit 152 of the POS terminal 10.

The second modulation unit 252 generates the control signal for transmitting the setting content received by the reception unit 251 by the visible light communication. Specifically, the second modulation unit 252 generates the control signal for the visible light communication by superimposing the information indicating the setting content received by the reception unit 251 on the control signal for controlling the light emission of the lighting device 40.

The second light source control unit 253 controls the light emission of the lighting device 40 based on the control signal generated by the second modulation unit 252. The second light source control unit 253 transmits the setting content received by the reception unit 251, that is, the setting content when the setting is changed with the POS terminal 10 by the visible light communication, by controlling the light emission of the lighting device 40.

The repair terminal 30 includes a reception unit 351, a matching unit 352, and an output unit 353, as the functional units.

Some or all of the functional units described above may be a software configuration which is realized in cooperation with a program stored in the processor (for example, the CPU 301) and the memory (for example, the ROM 302 and the storage unit 305) of the repair terminal 30. Some or all of the functional units of the functional units described above may be a hardware configuration realized by a dedicated circuit or the like mounted on the repair terminal 30.

The reception unit 351 is an example of the reception means. The reception unit 351 receives the information transmitted by the visible light communication by analyzing the image data obtained by the imaging with the imaging unit 310. Specifically, the reception unit 351 analyzes the intensity (vibration) of the light received by the imaging unit 310 to acquire the information superimposed on the corresponding light.

For example, when the clerk display unit 110 is imaged with the imaging unit 310, the reception unit 351 analyzes the intensity of light emitted by the back light 1101 that is imaged in a moving image to acquire the setting content superimposed on the corresponding light. For example, when the lighting device 40 is imaged with the imaging unit 310, the reception unit 351 analyzes the intensity of the light emitted by the lighting device 40 that is imaged in a moving image to acquire the setting content superimposed on the corresponding light.

The matching unit 352 is an example of the matching means. The matching unit 352 determine whether the setting changed by the POS terminal 10 is appropriate on a per setting item basis by matching the setting content received by the reception unit 351 with the matching setting information 3051 stored in the storage unit 305.

Specifically, the matching unit 352 matches the setting value of the setting item included in the setting content with the setting value of the corresponding setting item stored in the matching setting information 3051 on a per setting item basis. Also, as a result of the matching, the matching unit 352 determines that the setting item of which the setting value is identical is appropriate and determines that the setting item of which the setting value is not identical is inappropriate.

The output unit 353 is an example of the output means. The output unit 353 outputs a matching result of the matching unit 352. Specifically, the output unit 353 causes the display unit 309 to display and output a screen presenting the determination result on a per setting item basis obtained by the matching of the matching unit 352. Hereinafter, referring to FIGS. 10 to 12, a screen example output by the output unit 353 is described.

Figure 10:
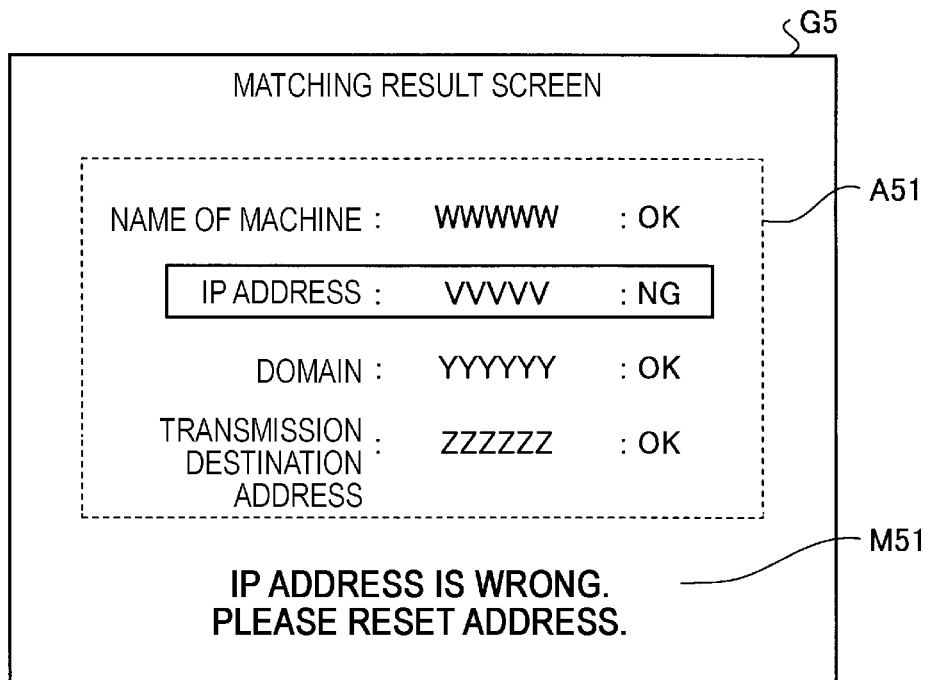
FIG. 10 is a diagram illustrating an example of a screen displayed by an output unit according to the first embodiment.
Figure 11:
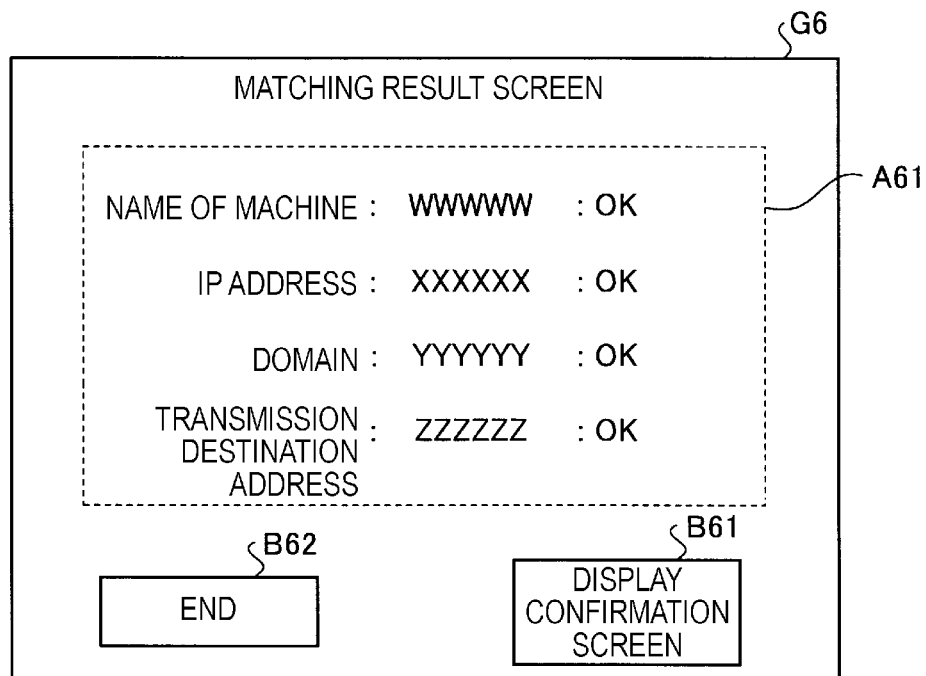
FIG. 11 is a diagram illustrating an example of the screen displayed by the output unit.
Figure 12:
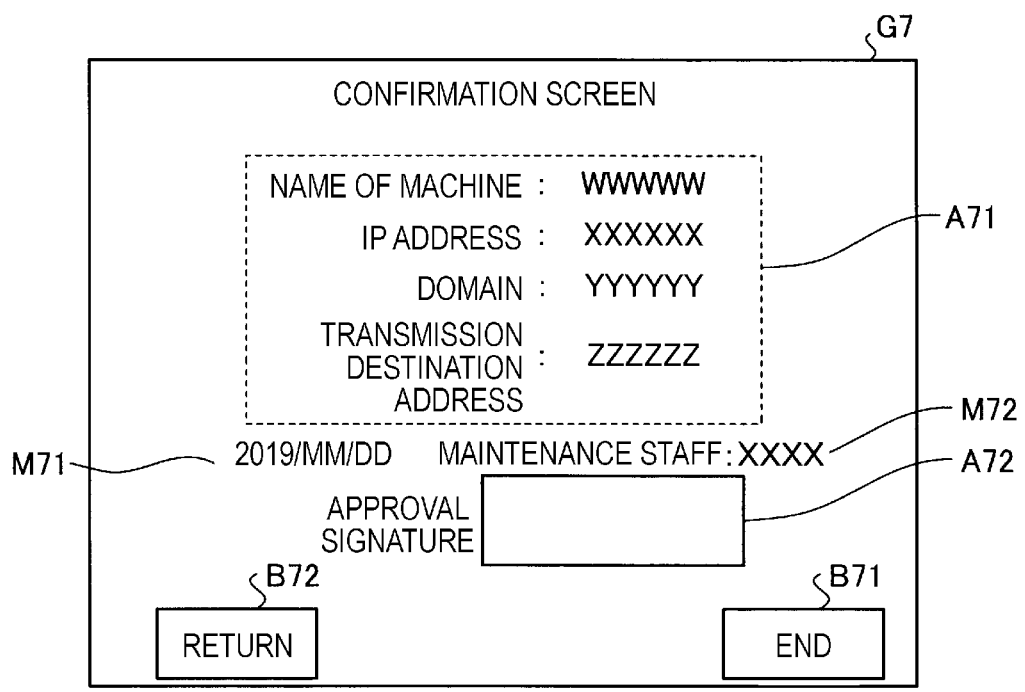
FIG. 12 is a diagram illustrating an example of the screen displayed by the output unit.

FIGS. 10 to 12 are diagrams illustrating examples of a screen displayed by the output unit 353. Referring to FIG. 10, a matching result screen displayed when there is a setting item determined as inappropriate is described.

FIG. 10 is a diagram illustrating an example of the matching result screen. As illustrated in FIG. 10, a matching result screen G5 has an area A51 for displaying a matching result of the matching unit 352. A matching result on a per setting item basis which is included in the setting content is displayed on the area A51.

Specifically, the output unit 353 displays the setting item and the setting value included in the setting content and the matching result (OK or NG) of the matching unit 352 in a correlating manner. Here, a case where the setting value of a setting item "IP address" is the matching result "NG" is exemplified, and the output unit 353 highlights and displays an entry of the corresponding "IP address". The output unit 353 causes the matching result screen G5 to display a notification of a setting mistake and a message M51 promoting resetting with respect to the setting item "IP address" of which the matching result is "NG".

Accordingly, the maintenance staff looks at the matching result screen G5 described above and can easily confirm the appropriateness of the setting changed by the POS terminal 10 and the setting item in which a setting mistake is detected. In this case, the maintenance staff can efficiently reset the setting item in which a setting mistake is detected by operating the return button B33 displayed on the transmission method selection screen G4 of FIG. 9.

The example of FIG. 10 is a form in which a setting value which is included in the setting content and is wrong is displayed with respect to the setting item "IP address" in which the matching result is "NG", but the form is not limited to this, and a correct setting value stored in the matching setting information 3051 may be displayed in a comparable manner.

FIG. 11 illustrates another example of a matching result screen. As illustrated in FIG. 11, a matching result screen G6 has an area A61 for displaying the matching result of the matching unit 352 in the same manner as the matching result screen G5 of FIG. 10. Here, a display example when matching results are "OK" with respect to all setting items is illustrated.

When the matching results are "OK" with respect to all setting items, the output unit 353 displays a confirmation screen display button B61 and an end button B62 as illustrated in the matching result screen G6. Here, the end button B62 is an operator for instructing an end of the setting change. When an operation of the end button B62 is received, the output unit 353 eliminates the matching result screen G6 and ends an output process.

Meanwhile, the confirmation screen display button B61 is an operator for instructing transition to a confirmation screen for generating evidence data indicating performance of the setting change. When an operation of the confirmation screen display button B61 is received, the output unit 353 eliminates the matching result screen G6 and causes the display unit 309 to display the confirmation screen illustrated in FIG. 12.

FIG. 12 is a diagram illustrating an example of the confirmation screen. As illustrated in FIG. 12, an area A71 for displaying a content of the setting changed with the POS terminal 10 is provided on a confirmation screen G7. A set of the setting items and the setting values included in the setting content transmitted from the POS terminal 10 is displayed in the area A71. The present embodiment is configured to instruct a display of the confirmation screen G7 from the matching result screen G6 displayed when it is determined that all setting items are appropriate, and thus the setting items that are determined as appropriate in the matching unit 352 are displayed in the area A71.

Date information M71 indicating a current date and maintenance staff information M72 indicating the name or the like of the maintenance staff operating the repair terminal 30 are displayed on the confirmation screen G7. For example, the maintenance staff information may be set in the storage unit 305 in advance or may be input via the operation unit 308.

An area A72 for inputting a signature of a manager to approve the change work is provided on the confirmation screen G7. Here, the manager means a shop manager of the store or a manager who manages the POS terminal 10 in the store. When the operation unit 308 is configured with a touch panel, for example, handwritten characters can be input in the area A72, and an approval signature is input by the manager.

When the operation unit 308 is not configured with a touch panel, for example, a form in which the confirmation screen G7 is printed by using a printer device (not illustrated) connected to the repair terminal 30 so that an approval signature is entered in the area A72 may be possible. In this case, an operator for instructing the printing of the confirmation screen G7 may be independently provided.

An end button B71 and a return button B72 are provided on the confirmation screen G7. Here, the end button B71 is an operator for instructing an end of the confirmation work. When an operation of the end button B71 is received, the output unit 353 stores the confirmation screen G7 in the storage unit 305 as the evidence data, and then eliminates the confirmation screen G7, to end an output process. By disabling or hiding the end button B71 until an approval signature is input in the area A72, a control may be performed so that storage of the evidence data while an approval signature is not input is suppressed.

The return button B72 is an operator for instructing a return to the matching result screen G6. When an operation of the return button B72 is received, the output unit 353 eliminates the confirmation screen G7 and displays the matching result screen G6 again.

A device which is an output destination of the output unit 353 is not limited to the display unit 309. For example, when a printer device is connected to the repair terminal 30, a form in which the printer device is set as the output destination, and the evidence data or the like is printed and output to the printer device may be possible.

As described above, in the repair system 1, the setting is changed by the maintenance staff with the POS terminal 10, the setting content changed by the setting change is transmitted by visible light communication via the clerk display unit 11 or the lighting device 40. Therefore, the maintenance staff can input the setting content of the setting information changed with the POS terminal 10 to the repair terminal 30 by causing the imaging unit 310 of the repair terminal 30 carried by the maintenance staff to face the clerk display unit 110 or the lighting device 40.

Therefore, in the repair system 1, even in an environment in which the repair terminal 30 cannot be connected to the network N1 or the POS terminal 10, for example, because of the security or the like, the setting content when the setting is changed with the POS terminal 10 can be delivered to the repair terminal 30. Since the maintenance staff can acquire the setting content when the setting is changed with the POS terminal 10 without performing a procedure for connection to the POS terminal 10 or the network N1, the repair work can be efficiently performed.

The repair terminal 30 determines whether the setting content when the setting is changed with the POS terminal 10 is appropriate by matching the setting content received by the visible light communication with the matching setting information 3051 stored in advance. The repair terminal 30 outputs the determination result of the appropriateness on a per setting item basis when the setting is changed.

Accordingly, the maintenance staff can easily confirm the appropriateness of the setting changed with the POS terminal 10 via the repair terminal 30. Therefore, in the repair system 1, since the confirmation work of the setting content visually performed by the maintenance staff can be omitted, the setting change can be efficiently performed and the generation of the setting mistake due to the confirmation omission or the like can be suppressed.

An operation example of the repair system 1 described above is described.

Figure 13:
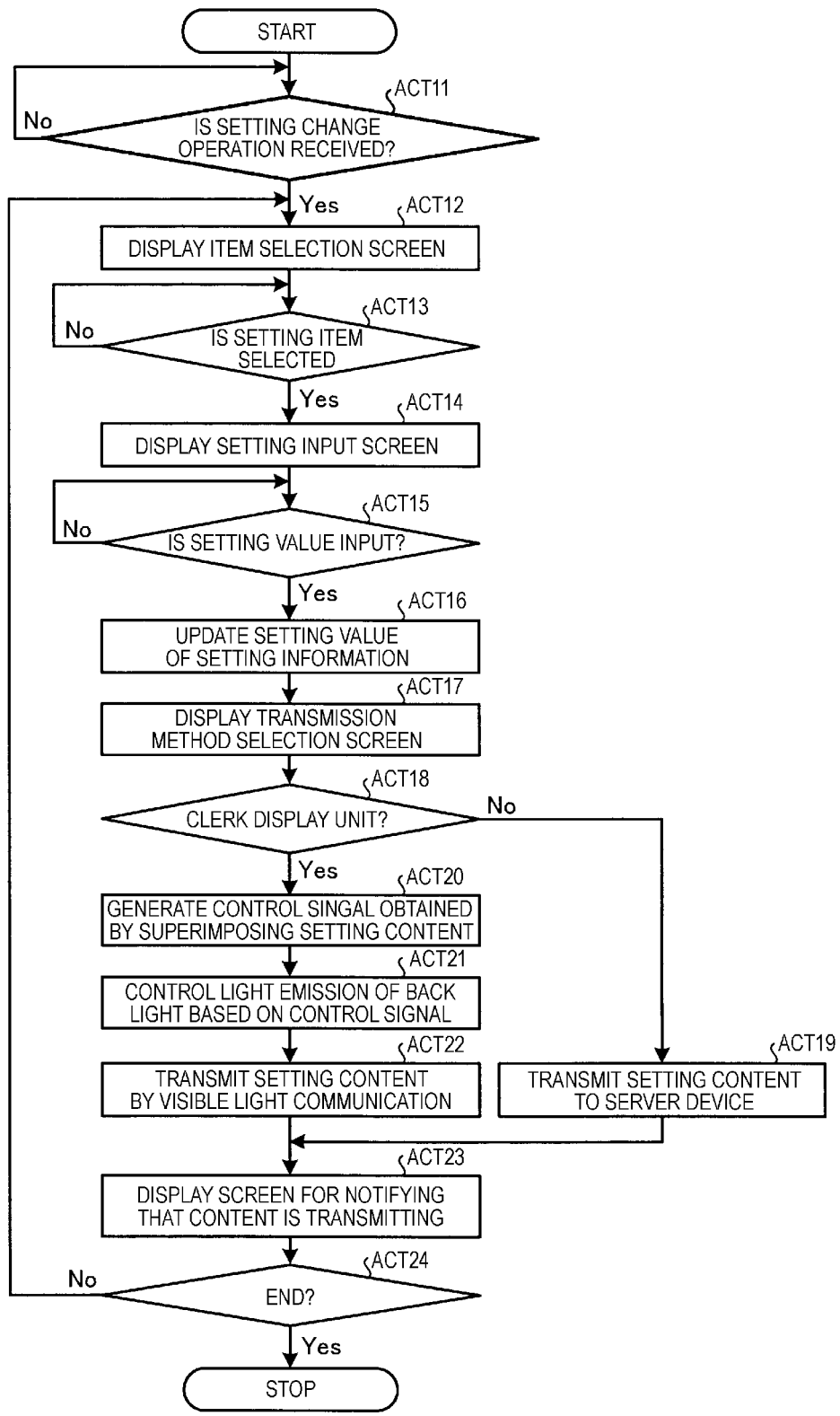
FIG. 13 is a flowchart for describing an example of a process performed by the POS terminal.

Referring to FIG. 13, first, an operation example of the POS terminal 10 is described. FIG. 13 is a flowchart for describing an example of a process performed by the POS terminal 10. As a premise of this process, it is assumed that the POS terminal 10 is operated in a maintenance mode. In the present process, for convenience of description, processes according to the operations of the return buttons B22, B33, and the like illustrated in FIGS. 7 to 9 are appropriately omitted.

First, the setting change supporting portion 151 stands by until an operation (hereinafter, also referred to as a setting change operation) of inputting an instruction of the start of the setting change is received (ACT 11; No). When the setting change operation is received (ACT 11; Yes), the setting change supporting portion 151 causes the clerk display unit 110 to display an item selection screen (refer to FIG. 6) for selecting a setting item of a setting target based on the setting information 1053 (ACT 12).

Subsequently, the setting change supporting portion 151 stands by until a setting item is selected from the item selection screen (ACT 13; No). When the selection operation of the setting item is received (ACT 13; Yes), the setting change supporting portion 151 causes the clerk display unit 110 to display a setting input screen (refer to FIG. 7) for inputting a setting value of the selected setting item (ACT 14).

Subsequently, the setting change supporting portion 151 stands by until the setting value is input on the setting input screen (ACT 15; No). When the setting value is input (ACT 15; Yes), the setting change supporting portion 151 updates the setting information 1053 by overwriting the input setting value on the setting value of the corresponding setting item stored in the setting information 1053 (ACT 16).

Subsequently, the setting change supporting portion 151 causes the clerk display unit 110 to display the transmission method selection screen (refer to FIG. 8) for selecting a transmission method of the setting content when the setting is changed (ACT 17). Subsequently, the setting change supporting portion 151 stands by until the transmission method is selected (ACT 18). Specifically, the setting change supporting portion 151 stands by until any one of the clerk display unit 110 (the back light 1101) and the lighting device 40 is selected.

Here, when the lighting device 40 is selected (ACT 18; No), the transmission unit 152 transmits the setting content set in ACT 16 to the server device 20 (ACT 19), and transitions to ACT 23.

Meanwhile, when the clerk display unit 110 is selected (ACT 18; Yes), the first modulation unit 153 generates the control signal for the visible light communication on which the setting content set in ACT 16 is superimposed (ACT 20). Subsequently, the first light source control unit 154 controls the light emission of the back light 1101 based on the control signal generated in ACT 20 (ACT 21), transmits the setting content by the visible light communication using the back light 1101 (ACT 22), and transitions to ACT 23.

Subsequently, the setting change supporting portion 151 causes the clerk display unit 110 to display a screen (refer to FIG. 9) for notifying that the setting content is transmitting by the selected transmission method (ACT 23). Subsequently, the setting change supporting portion 151 determines whether the end operation of the setting change operation is received (ACT 24).

Here, due to the resetting of the setting value or the like, it is determined that an end operation is not performed (ACT 24; No), the setting change supporting portion 151 returns the process to ACT 12, so that the setting item of the setting target is selected again. When the end operation is received (ACT 24; Yes), the setting change supporting portion 151 ends the present process.

Figure 14:
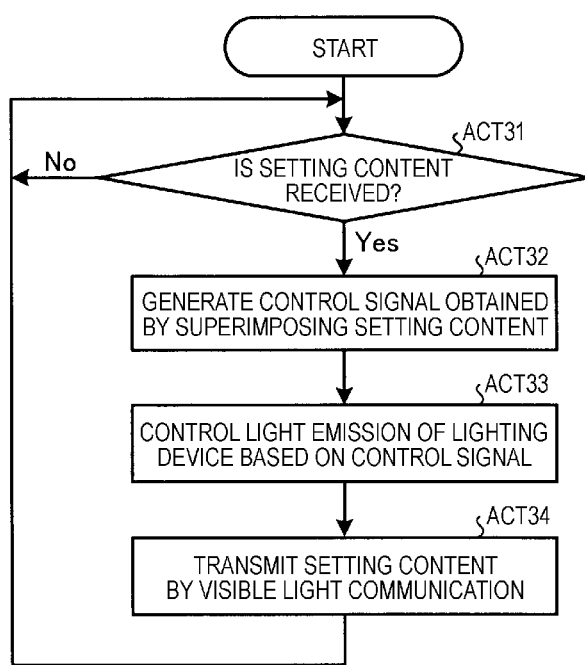
FIG. 14 is a flowchart for describing an example of a process performed by the server.

Subsequently, referring to FIG. 14, an operation example of the server device 20 is described. FIG. 14 is a flowchart for describing an example of a process performed by the server device 20.

First, the reception unit 251 stands by until the setting content of the setting changed with the POS terminal 10 is transmitted from the POS terminal 10 (ACT 31; No). When the reception unit 251 receives the setting content from the POS terminal 10 (ACT 31; Yes), the process transitions to ACT 32.

The second modulation unit 252 generates the control signal for the visible light communication on which the setting content received in ACT 31 is superimposed (ACT 32). Subsequently, the second light source control unit 253 controls the light emission of the lighting device 40 based on the control signal generated in ACT 32 (ACT 33) to transmit the work content by the visible light communication using the lighting device 40 (ACT 34). Also, the second light source control unit 253 returns the process to ACT 31.

Figure 15:
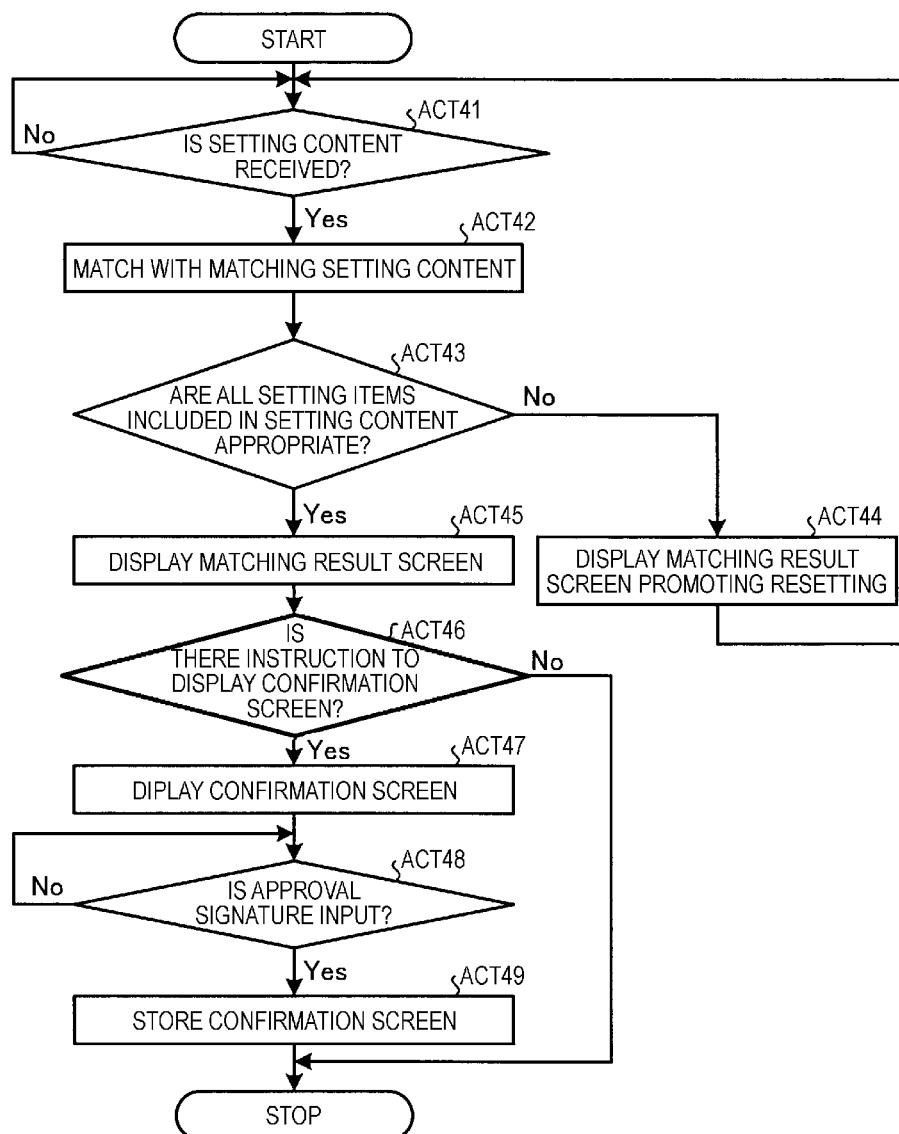
FIG. 15 is a flowchart for describing an example of a process performed by the repair terminal.

Subsequently, referring to FIG. 15, an operation example of the repair terminal 30 is described. FIG. 15 is a flowchart for describing an example of a process performed by the repair terminal 30. In the present process, for convenience of description, a process according to the operation of the return button B72 or the like illustrated in FIG. 12 is appropriately omitted.

First, the reception unit 351 monitors the image data imaged with the imaging unit 310 and stands by until the setting content is transmitted by the visible light communication (ACT 41; No). When the setting content is received (ACT 41; Yes), the reception unit 351 transitions the process to ACT 42.

Subsequently, the matching unit 352 matches the setting content received in ACT 41 with the matching setting information 3051 stored in the storage unit 305 and determines the appropriateness of the setting value on a per setting item basis included in the setting content (ACT 42).

Subsequently, the output unit 353 determines whether all setting items included in the work content are determined as appropriate based on the matching result of ACT 42 (ACT 43). When a setting item determined as inappropriate is included (ACT 43; No), the output unit 353 causes the display unit 309 to display a matching result screen (refer to FIG. 10) for promoting resetting together with presenting the matching result of ACT 32 (ACT 44) and returns the process to ACT 41.

Meanwhile, when all setting items are determined as appropriate (ACT 43; Yes), the output unit 353 causes the display unit 309 to display a matching result screen (refer to FIG. 11) presenting the matching result of ACT 42 (ACT 45). Subsequently, the output unit 353 determines whether the display of the confirmation screen is instructed (ACT 46). Here, when the display of the confirmation screen is not instructed (ACT 46; No), the present process ends.

When the instruction of the display of the confirmation screen is received (ACT 46; Yes), the output unit 353 causes the display unit 309 to display the confirmation screen for inputting the approval signature (ACT 47). Subsequently, the output unit 353 stands by until the approval signature is input on the confirmation screen (ACT 48; No).

Also, when the input of the approval signature is received (ACT 48; Yes), the output unit 353 stores the confirmation screen on which the approval signature is input as the evidence data (ACT 49), the present process ends.

As described above, in the repair system 1, when the setting is changed with the POS terminal 10 by the maintenance staff, the setting content when the setting is changed is transmitted by the visible light communication via the clerk display unit 110 or the lighting device 40. In the repair system 1, when the repair terminal 30 receives the work content transmitted by the visible light communication, the repair terminal 30 matches the work content with the matching setting information 3051 and causes the repair terminal 30 to display the screen indicating the appropriateness of the setting content on a per setting item basis.

According to the repair system 1, the maintenance staff carrying the repair terminal 30 can be notified of the appropriateness of the setting content when the setting is changed with the POS terminal 10. Accordingly, the repair system 1 can notify the maintenance staff of the appropriateness of the setting content when the setting is changed in real time. Accordingly, in the repair system 1, since the generation of a setting mistake due to the confirmation omission can be suppressed together with the omission of the confirmation work by the visual observation of the maintenance staff, the change work of the setting information can be efficiently performed.

According to the repair system 1, by the visible light communication using the back light 1101 or the lighting device 40, the setting content of the POS terminal 10 can be delivered to the repair terminal 30 without connecting the repair terminal 30 to the network N1. Accordingly, even in the environment where the repair terminal 30 cannot be connected to the network N1 or the POS terminal 10, the setting content when the setting is changed with the POS terminal 10 can be delivered to the repair terminal 30. Accordingly, since the maintenance staff can acquire the setting content when the setting is changed with the POS terminal 10 in the repair terminal 30 by imaging the clerk display unit 110 or the lighting device 40 without the procedure according to the communication with the POS terminal 10, the change work of the setting information or the repair work can be efficiently performed.

Second Embodiment

Subsequently, the second embodiment is described. According to the first embodiment described above, a form in which the POS terminal 10 is transmitted end time to the server device 20 via the network N1 is described. However, the transmission method of the end time with respect to the server device 20 is not limited to this. Here, according to the present embodiment, a form in which the end time is transmitted to the server device 20 by using the visible light communication is described as an example of another transmission method. Configurations which are the same as those in the first embodiment are denoted by the same reference numerals, and the description thereof is omitted.

Figure 16:
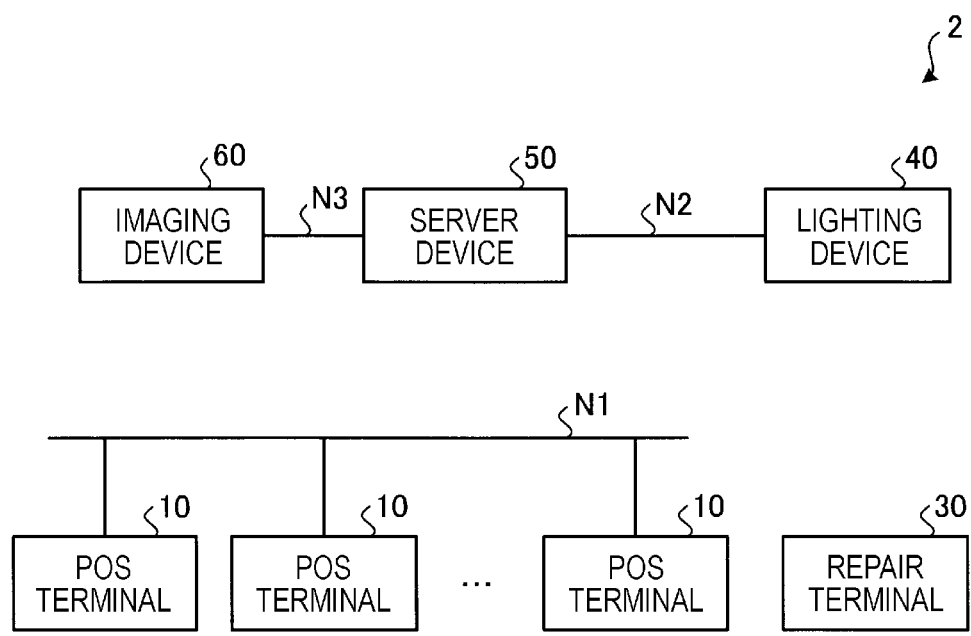
FIG. 16 is a diagram illustrating an example of a repair system according to a second embodiment.

FIG. 16 is a diagram illustrating an example of the repair system according to the present embodiment. As illustrated in FIG. 16, a repair system 2 includes the POS terminal 10, a server device 50, the repair terminal 30, and the lighting device 40. The repair system 2 further includes an imaging device 60. Here, the server device 50 and the lighting device 40 are connected via the cable N2 such as a control line. The server device 50 and the imaging device 60 are connected via a cable N3 such as a data transmission line. According to the present embodiment, the server device 50 is disconnected from the network N1.

The imaging device 60 is an imaging device having an image sensor such as a CCD or a CMOS. For example, the imaging device 60 is a monitor camera installed on a ceiling part of an area where the POS terminal 10 is provided, and can image at least the clerk display unit 110 included in the POS terminal 10.

According to the present embodiment, the imaging device 60 can image a moving image as the image data. The imaging device 60 is used for receiving light emitted by the clerk display unit 110 (the back light 1101) or the lighting device 40. Instead of the imaging device 60, a configuration in which a light receiving device for the visible light communication is included may be possible.

The server device 50 is a device corresponding to the server device 20 of the first embodiment described above. For example, the server device 50 has a hardware configuration illustrated in FIG. 17. Here, FIG. 17 is a diagram illustrating an example of the hardware configuration of the server device 50.

Figure 17:
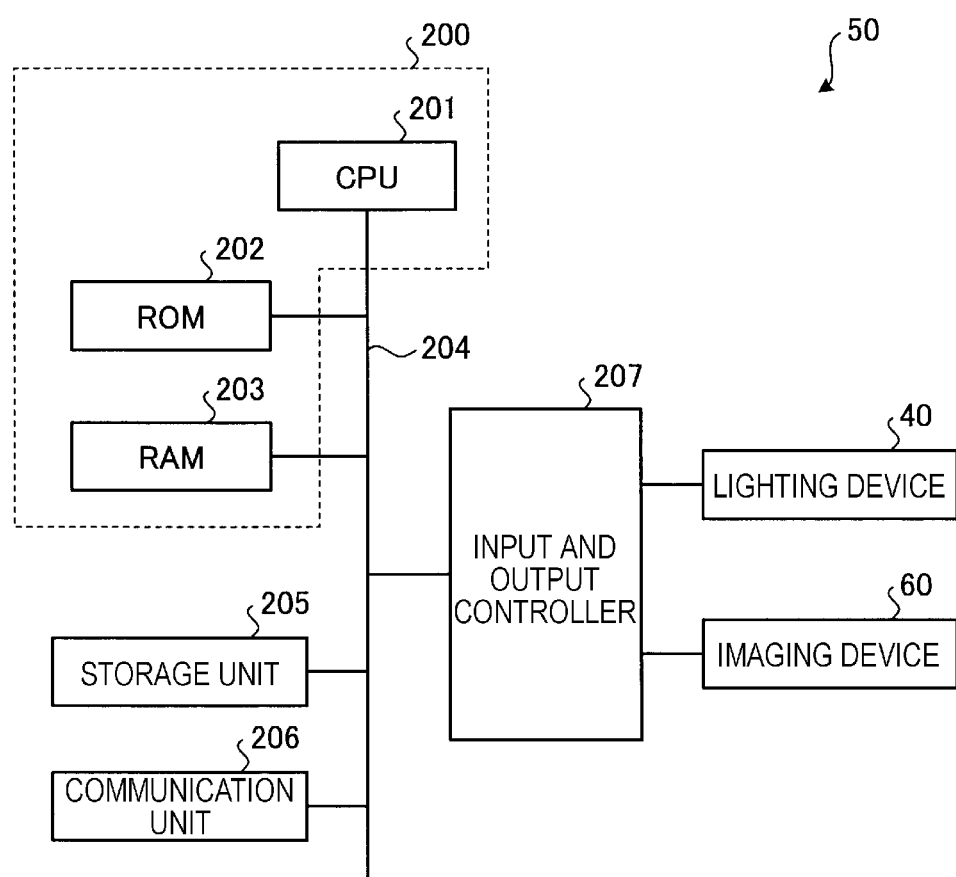
FIG. 17 is a diagram illustrating an example of a hardware configuration of a server device according to the second embodiment.

As illustrated in FIG. 17, the server device 50 includes the control unit 200 of the computer configurations such as the CPU 201, the ROM 202, and the RAM 203. The storage unit 205 and the communication unit 206 are connected to the control unit 200 via the bus 204. The lighting device 40 and the imaging device 60 are connected to the control unit 200 via the bus 204, the input and output controller 207, and the like. The image data imaged with the imaging device 60 is input to the control unit 200.

Figure 18:
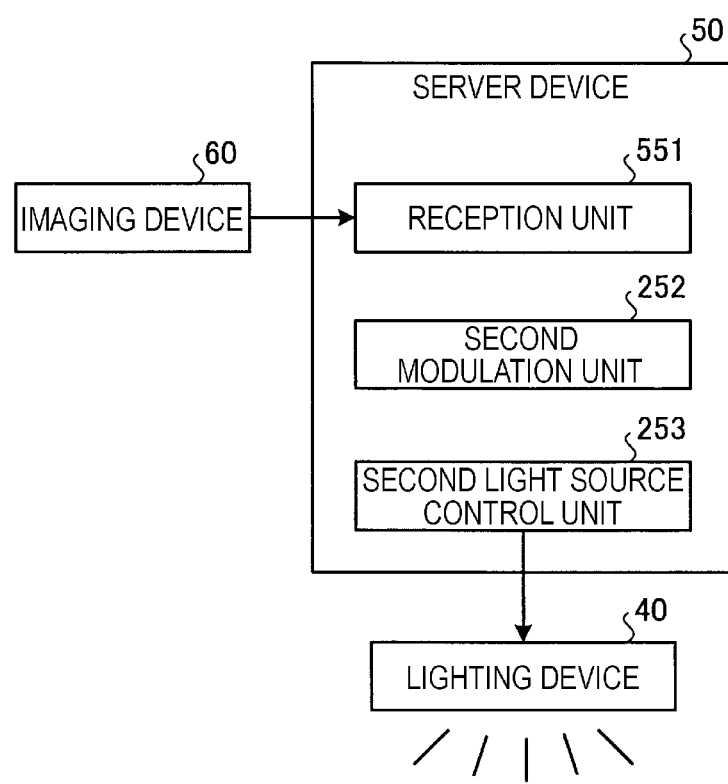
FIG. 18 is a diagram illustrating an example of a functional configuration of the server device.

For example, the server device 50 has a functional configuration illustrated in FIG. 18. Here, FIG. 18 is a diagram illustrating an example of a functional configuration of the server device 50.

As illustrated in FIG. 18, the server device 50 includes a reception unit 551, the second modulation unit 252, and the second light source control unit 253, as the functional units.

Here, the reception unit 551 is a functional unit provided instead of the reception unit 251 described above. The reception unit 551 analyzes the image data imaged with the imaging device 60 to receive the information transmitted by the visible light communication. Specifically, the reception unit 551 analyzes the intensity (vibration) of the light received by the imaging device 60 to receive the information that is superimposed on the corresponding light.

For example, the reception unit 551 analyzes the intensity of the light emitted by the back light 1101 of the clerk display unit 110 from the image data of the clerk display unit 110 imaged by the imaging device 60 to receive the setting content superimposed on the corresponding light. That is, the POS terminal 10 and the server device 50 according to the present embodiment can transmit and receive the setting content by the visible light communication.

The second modulation unit 252 performs operations which are the same as those in the first embodiment based on the end time received by the reception unit 551. Accordingly, the server device 50 can transmit the setting content when the setting is changed with the POS terminal 10 to the repair terminal 30 by the visible light communication via the lighting device 40 in the same manner as the server device 20.

Subsequently, referring to the flowchart of FIG. 14 described above, an operation example of the server device 50 is described.

First, the reception unit 551 monitors the image data imaged with the imaging unit 310 and stands by until the setting content is transmitted by the visible light communication (ACT 31; No). When the reception unit 551 receives the setting content (ACT 31; Yes), the process transitions to ACT 32. Processes subsequent to ACT 32 are the same as those in FIG. 7, and thus the descriptions thereof are omitted.

As described above, according to the present embodiment, the setting content can be delivered from the POS terminal 10 to the server device 50 by using the visible light communication. Accordingly, for example, when the POS terminal 10 is operated by standing alone or in the environment where the network connection with the POS terminal 10 and the server device 20 is disconnected, the setting content when the setting is changed with the POS terminal 10 can be delivered to the server device 50. Accordingly, the same effect as in the embodiment described above can be achieved.

When the configuration of the present embodiment is employed, the transmission unit 152 of the POS terminal 10 becomes unnecessary, and thus may be configured to be disabled or may be removed from the POS terminal 10.

The embodiments (the first embodiment and the second embodiment) described above can be appropriately modified to be implemented by changing a part of the configuration or function of each device described above. Therefore, some modifications according to the above embodiment are described below as other embodiments. In the following, points different from the above embodiment are mainly described, and detailed description of points common to the already described contents will be omitted. The modified examples described below may be implemented individually or may be appropriately combined and implemented.

(Modification 1)

In the above embodiment, the example in which the LED is used as the light sources of the back light 1101 and the lighting device 40 is used is described, but the type of the light source is not limited to this. Here, it is preferable to use a light source that can be modulated in a high frequency band where the human eyes do not feel flicker.

Further, in the above embodiment, an example in which the visible light communication is performed by using the back light 1101 of the clerk display unit 110 is described, but the light source device of the POS terminal 10 used in the visible light communication is not limited to this. For example, the visible light communication may be performed by using the back light of the customer display unit 111. For example, the visible light communication may be performed by using an indicator lamp included in a device such as the printer 112.

When other light source devices other than the back light 1101 and the lighting device 40 are used, a light source device to be used may be selected together with other light source devices on the transmission method selection screen described above.

(Modification 2)

According to the above embodiment, a case where the setting is changed in one POS terminal 10 is described, but the same can be applied to a case where the setting change operation is performed in parallel for the plurality of POS terminals 10. In this case, each of the POS terminals 10 includes the terminal ID for identifying its own POS terminal 10 in the setting content and performs transmission.

The output unit 353 of the repair terminal 30 outputs the matching result of the setting content performed in the matching unit 352 on a per terminal ID basis included in the corresponding setting content. Accordingly, the appropriateness of the setting change performed in each of the POS terminals 10 may be independently output on a per POS terminal 10 basis.

(Modification 3)

The above embodiment is a form in which the POS terminal 10 performs the visible light communication by the lighting device 40 via the server device 20, but the embodiment is not limited to this. A form in which the POS terminal 10 directly controls the light emission of the lighting device 40 may be possible. In this case, for example, the POS terminal 10 and the lighting device 40 are connected to each other via a control line, and the first modulation unit 153 and the first light source control unit 154 perform the visible light communication by using the lighting device 40. Therefore, since the setting content when the setting is changed by the POS terminal 10 can be delivered to the repair terminal 30 in the visible light communication by the lighting device 40, the same effect as the above embodiment can be achieved.

When the configuration of the present modification is employed, the transmission unit 152 of the POS terminal 10 becomes unnecessary, and thus may be configured to be disabled or may be removed from the POS terminal 10.

(Modification 4)

In the above embodiment, a form in which the POS terminal 10 selectively uses one light source device from among the light source devices of the clerk display unit 110 (the back light 1101) and the lighting device 40 connected to its own device and performs the visible light communication is described. However, the embodiment is not limited to this form, and the POS terminal 10 may have a form of performing the visible light communication by using all light source devices connected to its own device.

In this case, the setting change supporting portion 151 of the POS terminal 10 may display a screen for notifying that transmission is being performed by using the clerk display unit 110 (the back light 1101) and the lighting device 40, instead of the transmission method selection screen illustrated in FIGS. 8 and 9.

(Modification 5)

The above embodiment is described by using the POS terminal 10, but the information processing device to be the target of the setting change is not limited to the POS terminal 10. For example, even when the target is the server device 20 or an information processing device such as a personal computer (PC) (not illustrated), the system configuration or the device configuration which are the same as those in the above embodiment may be applied. Therefore, even in a setting change work of a PC used in an office, the same effect as the above embodiment can be achieved.

The program performed in each device according to the above embodiment is provided by being combined in a ROM or the like in advance. The program executed in each device according to the above embodiment may be configured to be recorded in a computer-readable recording medium such as CD-ROM, a flexible disk (FD), CDR, and a digital versatile disk (DVD) in a file in an installable format or in an executable format.

The program executed by each device of the above embodiment may be configured to be stored on a computer connected to a network such as the Internet, and may be configured to be provided by being downloaded via the network. The program executed by each device of the above embodiments may be configured to be provided or distributed via a network such as the Internet.

While certain embodiments have been presented, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory machine-readable computer program product for a repair terminal, the non-transitory machine-readable computer program product comprising a non-transitory computer readable storage medium having program instructions embodied therewith, the program instructions executable by a processing component to cause the processing component to:

receive a setting value of a predetermined setting item set in an information processing device by visible light communication using light emitted by a light source device connected to the information processing device;

match the setting value of the setting item received with a matching setting value corresponding to the setting item and determining appropriateness of the setting value; and output a matching result of the match.

2. The non-transitory machine-readable computer program product according to claim 1, further causing the processing component to:

output the matching result obtained by associating the setting value on a per setting item basis with a determination result of the appropriateness of the setting value.

3. The non-transitory machine-readable computer program product according to claim 1, further causing the processing component to:

when the matching result includes the setting value determined as inappropriate, highlight and output the setting value determined as inappropriate and the setting item corresponding to the setting value.

4. The non-transitory machine-readable computer program product according to claim 1, wherein the light source device is a light emitting diode.

5. The non-transitory machine-readable computer program product according to claim 1, further causing the processing component to:

facilitate confirmation of the setting value.

6. The non-transitory machine-readable computer program product according to claim 1, further causing the processing component to:

Initiate a plurality of operations.

7. The non-transitory machine-readable computer program product according to claim 1, wherein the non-transitory machine-readable computer program product is comprised in a tablet.

8. The non-transitory machine-readable computer program product according to claim 1, wherein the non-transitory machine-readable computer program product is comprised in a smartphone.

9. A non-transitory computer-readable medium having stored thereon executable instructions that, in response to execution by a processor, causes a memory system to perform operations, the operations comprising:

receiving an input of a setting value for a setting item of a setting target;

setting the input setting value as a setting value of the setting item to an information processing device; and transmitting the setting value of the setting item set by the setting by visible light communication using light emitted by a light source device connected to the information processing device.

10. The non-transitory computer-readable medium according to claim 9, the operations comprising:
performing the visible light communication by using some or all of a plurality of the light source devices connected to the information processing device.

11. The non-transitory computer-readable medium according to claim 9, the operations comprising:
performing the visible light communication by using a light source device included in a display device connected to the information processing device.

12. The non-transitory computer-readable medium according to claim 9, the operations comprising:
receiving an input of a setting value for a setting item of a plurality of setting targets.

13. The non-transitory computer-readable medium according to claim 9,
wherein the light source device is a light emitting diode.

14. The non-transitory computer-readable medium according to claim 9, the operations comprising:
modulating the light emitted by the light source device.

15. The non-transitory computer-readable medium according to claim 9,
wherein the information processing device is a POS terminal.

16. A computer program product comprising a non-transitory computer-readable medium comprising a program that causes a processor to execute operations, comprising:
receiving a setting value of a predetermined setting item set in an information processing device by visible light communication using light emitted by a light source device connected to the information processing device;
matching the setting value of the setting item received with a matching setting value corresponding to the setting item and determining appropriateness of the setting value; and
outputting a matching result.

17. The computer program product according to claim 16, further comprising:
outputting the matching result obtained by associating the setting value on a per setting item basis with a determination result of the appropriateness of the setting value.

18. The computer program product according to claim 16, further comprising:
when the matching result includes the setting value determined as inappropriate, highlighting and outputting the setting value determined as inappropriate and the setting item corresponding to the setting value.

19. The computer program product according to claim 16, further comprising:
receiving an input of a setting value for a setting item of the setting target;
setting the input setting value as a setting value of the setting item to the information processing device; and
transmitting the setting value of the setting item set by the setting component by visible light communication using light emitted by a light source device connected to the information processing device.

20. The computer program product according to claim 19, further comprising:
transmitting by using some or all of a plurality of light source devices connected to the information processing device.

* * * * *